E. F. ALTMAN.
GRIDDLE GREASER.
APPLICATION FILED FEB. 2, 1909.

917,517.  Patented Apr. 6, 1909.

Witnesses
Frank B. Hoffman
J. W. Garner

Inventor
Esther F. Altman
By Victor J. Evans
Attorney

UNITED STATES PATENT OFFICE.

ESTHER F. ALTMAN, OF ST. PETERSBURG, PENNSYLVANIA.

GRIDDLE-GREASER.

No. 917,517.        Specification of Letters Patent.        Patented April 6, 1909.

Application filed February 2, 1909. Serial No. 475,706.

*To all whom it may concern:*

Be it known that I, ESTHER F. ALTMAN, a citizen of the United States, residing at St. Petersburg, in the county of Clarion and State of Pennsylvania, have invented new and useful Improvements in Griddle-Greasers, of which the following is a specification.

This invention is an improved device for use in greasing griddles, bread pans and other culinary articles and comprises a frame having a handle at one end and further provided with eyes through which a bacon rind may be passed and with prongs or pins disposed between said eyes to be forced through or into the bacon rind or other fat and coact with the eyes in securing the rind or fat as hereinafter more fully described and claimed.

The object of this invention is to provide a cheap, simple, strong and durable device of this character which may be readily used for greasing culinary articles and which holds the bacon rind or other fat so securely in place as to prevent it from dropping from the device.

Figure 1:
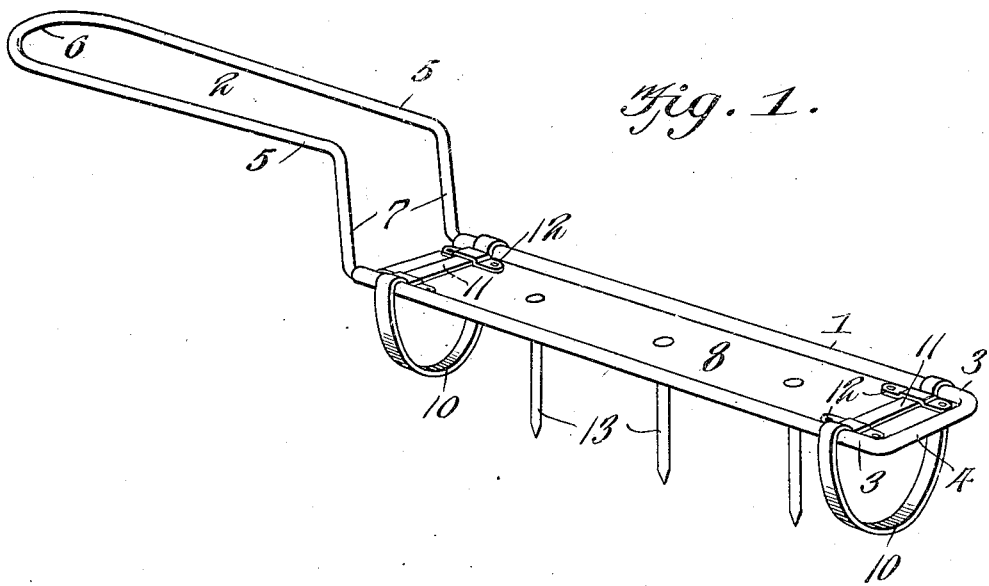
Figure 2:
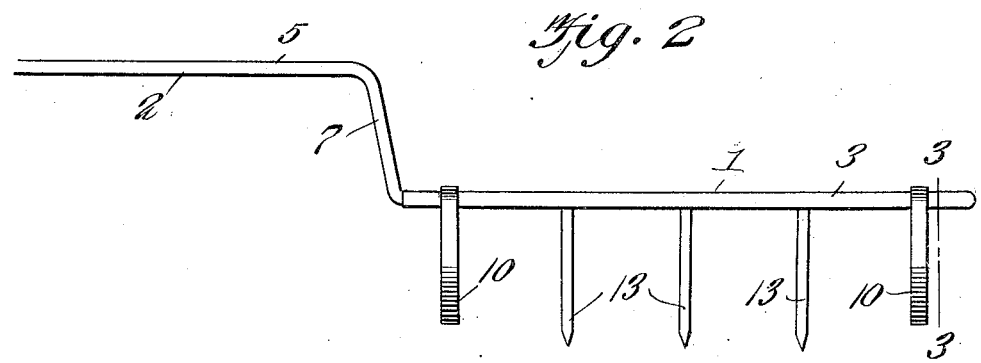
Figure 3:
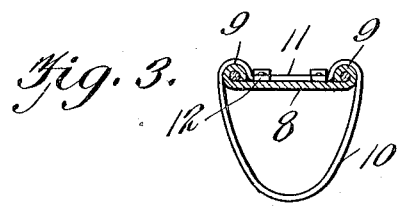

In the accompanying drawings:—Figure 1 is a perspective view of a griddle greaser constructed in accordance with this invention. Fig. 2 is an elevation of the same. Fig. 3 is a transverse sectional view of the same on the plane indicated by the line 3—3 of Fig. 2.

In the embodiment of the invention here shown, I provide an open frame 1 which is formed at one end with a handle 2 that extends first upwardly and then outwardly therefrom, the frame and the handle being integrally constructed of a single piece of wire of suitable gage, the frame comprising parallel side wires 3 and the connecting end 4 and the handle comprising a pair of side wires 5 and a curved connecting portion 6 at the outer end, said side wires 5 having offset portions 7 which dispose the handle at a higher plane than the frame. A plate 8 which may be made of tin or other suitable metal connects the sides of the frame 1 and has its side edges rolled over the side wires of the frame as at 9. Near the ends of the plate and frame are a pair of eyes or holders 10 which are also preferably made of sheet metal and are substantially semi-cylindrical in shape with their curved portions extending below the plate and frame and their straight upper cross bars 11 bearing on the plate and secured thereto as by means of keepers 12. At points between the said eyes or holders are a series of downwardly extending pins or prongs 13 having sharpened lower ends and the upper ends of which are secured to the plate.

In the use of the invention, the bacon rind or other strip of fat to be used for greasing the griddle, bread pan or other culinary articles is passed through the eyes or holes 10 and impaled upon the pins or prongs 13, the latter serving to hold the intermediate part of the rind or fat and the end portions of the rind or fat being held by the eyes or holes 10, hence there is no likelihood of the rind or fat becoming casually detached from the implement while the same is in use.

What is claimed is:—

1. An implement of the class described comprising a frame or body portion having a handle and further provided with a plurality of holding eyes on its under side and downwardly extending pins or prongs between said eyes for the purposes set forth.

2. An implement of the class described comprising a frame having spaced sides and provided at one end with a handle, a plate connecting the said spaced sides of the frame holding eyes at the ends of the frame extending below the same and prongs or pins which hold between said holding eyes and attached to said plate.

3. An implement of the class described comprising a frame having substantially parallel sides spaced apart, said frame being formed with a handle at one end thereof, a plate connecting the sides of said frame and having its edges rolled over said sides of the frame, impaling pins or prongs projecting downwardly through said plate and holding eyes projecting downwardly from said frame at the ends thereof, said impaling pins or prongs being disposed between said holding eyes.

In testimony whereof I affix my signature in presence of two witnesses.

ESTHER F. ALTMAN.

Witnesses:
  J. S. CRAIG,
  MILDRED M. BUNCH.